Figure 5:
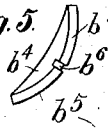

No. 834,045. PATENTED OCT. 23, 1906.
R. G. & L. CATOR.
WAGON BOX.
APPLICATION FILED AUG. 30, 1905.
Fig.1.
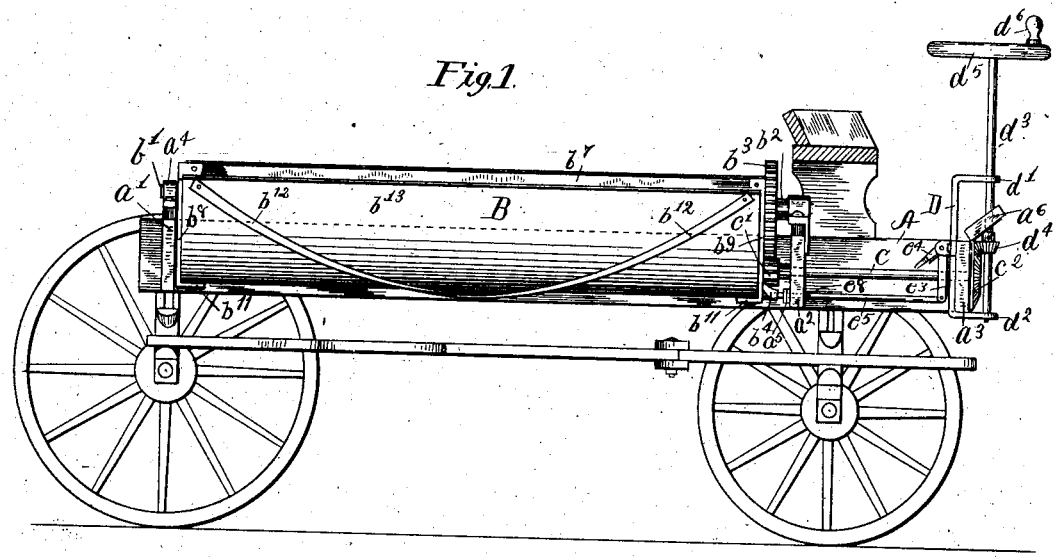
Fig.2.
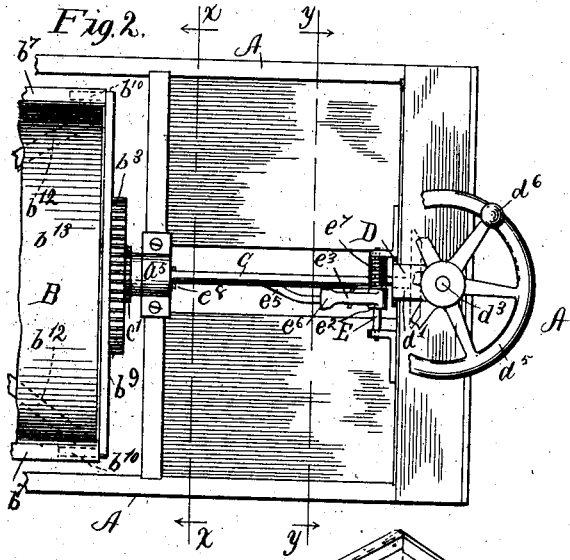
Fig.3.
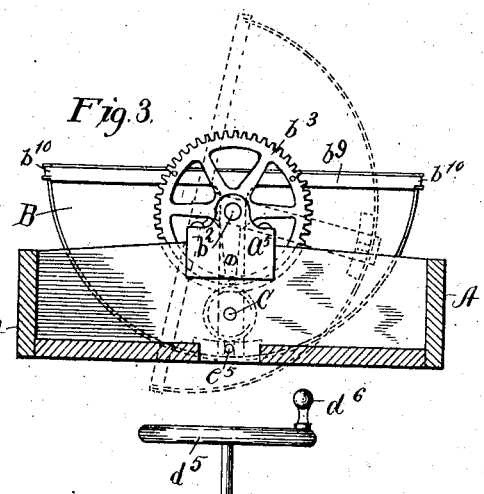
Fig.4.
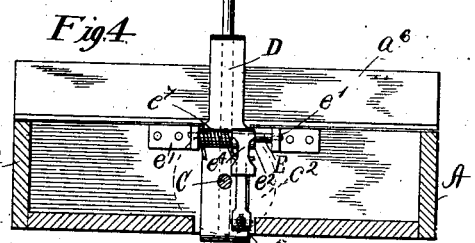
Fig.6.
Witnesses:
Chas. F. Bassett
M. A. Milard.

Inventors
R. G. Cator
Leon Cator
By Frederick Benjamin
Atty.

UNITED STATES PATENT OFFICE.

RICHARD G. CATOR AND LEON CATOR, OF PALMYRA, NEW YORK.

WAGON-BOX.

No. 834,045.  Specification of Letters Patent.  Patented Oct. 23, 1906.

Application filed August 30, 1905. Serial No. 276,331.

*To all whom it may concern:*

Be it known that we, RICHARD G. CATOR and LEON CATOR, citizens of the United States, residing at Palmyra, in the county of Wayne and State of New York, have invented certain new and useful Improvements in Wagon-Boxes, of which the following is a specification.

Our invention relates to dumping-wagons; and its object is to provide a strong and durable construction and at the same time to lessen the weight, to afford a convenient means for dumping the load, and to so arrange the mechanism to require a minimum amount of power to accomplish the results desired.

Among further advantages to be derived from our improvements are the bringing of the operating device within easy reach of any part of the driver's seat; distributing the load so that the weight will be apportioned alike to all the wheels; mounting the tank in such a manner that the load is carried comparatively low on the frame, thus facilitating the loading of the wagon from the ground; bringing the center of gravity of the load into such relation with the operating mechanism as to enable the dumping to be accomplished with a very slight power applied to the hand-wheel, and to permit the load to be dumped on either side of the vehicle. If the wagon is moving, the contents of the tank may be distributed along the line of motion, the rate of such distribution being regulated at will.

Another advantage in the construction of our dumping device is that it can be used on the ordinary running-gear of a wagon or of a bob-sled.

We attain these objects by the mechanism illustrated in the accompanying drawings, in which—

Figure 1 is a side elevation of our improved dumping-vehicle with one side of the supporting-frame removed. Fig. 2 is a fragmentary view of the forward end of the frame and tank. Fig. 3 is a sectional view on the line $xx$ of Fig. 2. Fig. 4 is a sectional view on the line $yy$ of Fig. 2. Fig. 5 is a perspective view of the automatic locking-block. Fig. 6 is a perspective view of the framework of the tank.

We prefer to make the body or tray semicylindrical in cross-section, although it may be constructed of a semi-oval or any curvilinear form desired. Side plates A, connected by cross-pieces $a'$ $a^2$ $a^3$, serve as a body or frame for the support of a semicylindrical tray B, which has trunnions $b'$ $b^2$ at each end, which are journaled in bearings $a^4$ $a^5$, affixed to the rear and median cross-pieces $a'$ $a^2$, the axes of the trunnions corresponding to the median line of the frame. Upon the front end of the tray B is bolted a spur-gear $b^3$, its center coinciding with the trunnion-axis, and near the lower edge is secured a block $b^4$, having beveled faces $b^5$ and a mortise $b^6$, the latter adapted to receive the end of the locking-rod hereinafter described.

A shaft C, lying in the median line, extends from the front end of the tray through the cross-pieces $a^2$ $a^3$ to the outside of the frame and has a pinion $c'$ upon its rear end for engagement with the spur-gear $b^3$, and upon its forward end, external to the frame, it carries a bevel-gear $c^2$. A hanger D, secured to the inner face of the front cross-piece $a^3$, has horizontal arms $d'$ $d^2$, which embrace the cross-piece $a^3$ and dash $a^6$, and carries a vertical shaft $d^3$, upon which is a bevel-gear $d^4$, which engages with the bevel-gear $c^2$, and at its upper end a hand-wheel $d^5$, to which is affixed a handle $d^6$. A shaft E, journaled in bearings $e'$, has a collar $e^2$, to which are secured two arms $e^3$ $e^4$. The longer arm $e^3$, extending vertically downward, has a rod $e^5$ pivoted to its lower end and extending rearwardly, being slightly bent so as to pass through the cross-piece $a^2$ on the median line and having its rear end adapted to engage with the mortise $b^6$ in the block $b^4$. A bearing $a^5$ prevents bending of the rod $e^5$ under stress of a load when in engagement with the block $b^4$. The shorter arm $e^4$ extends downward at an angle and has its free end $e^6$ widened to afford a foothold. The shaft E carries a spring $e^7$, which tends to keep the foot-lever $e^3$ and locking-rod $e^5$ in an extended position, such position being limited by the stop $e^8$.

By the method employed in constructing the tank B we secure great strength and durability with less weight than is the case with dumping-vehicles as usually constructed, and to accomplish this result in the best possible way we prefer to make the tank of comparatively thin sheet metal strengthened along the margins by channel-irons $b^7$, riveted thereto. The tank ends are strengthened by T-shaped braces $b^8$ $b^9$, the lateral ends of which, $b^{10}$, are bent at right angles to overlap the channel-irons $b^7$ and are bolted thereto, while the lower ends $b^{11}$ are also bent at an angle to lie beneath the bottom of the tray. The rear brace $b^8$ carries the rear trunnion $b'$, and to the forward brace is secured the spur-gear $b^3$ and the forward trunnion $b^2$. Additional braces $b^{12}$ extend diagonally from opposite corners, crossing beneath the main sheet $b^{13}$, which forms the chief portion of the body of the tank and to which the said braces are securely fastened at their ends. It will be seen that the channel-irons and the T-braces form a strong rectangular framework around the margin of the tank and in conjunction with the diagonal braces $b^{12}$ form a cradle in which the body of the tank rests. With this construction it follows that when the tank is loaded the stress, coming first on the main sheet, is transferred to the framework, and danger of rivets shearing or pulling through is avoided. The tendency of the load to depress the center of the tank puts tension upon the diagonal braces, and these being strongly secured to the tank adjacent to the ends of the channel-irons the latter are placed in compression, being kept apart at the ends by the T-braces and at the center by the load carried. That portion of the frame between the forward cross-pieces $a^2$ $a^3$ is furnished with a floor for convenience of the operator, a slight space being left in the center to afford room for the locking mechanism. The rest of the frame is left open at the bottom to allow for dumping the material which is carried in the tray. The frame A is made with the same dimensions as those of an ordinary wagon-bed and will thus fit between the bolster-stakes of any common wagon running-gear.

It will be noticed that the trunnions upon which the tank rotates are placed some distance below the upper margin of the tray, so that the center of gravity will approximate the center of rotation, and it will consequently require only a slight amount of power to be applied to the hand-wheel in order to dump the load.

When the tray is in its horizontal or initial position, the end of the rod $e^5$ projects into the mortise $b^6$, and thus prevents the tray from turning. When it is desired to dump the load, the driver takes hold of the hand-wheel and presses the lever $e^4$ downwardly with his foot. He can then control the position of the tray, tipping it slightly when the load is to be evenly distributed along the way or turning it at a greater angle when the load is to be deposited in one place, and the tray can be completely inverted, which may be desirable if a tenacious substance is carried. As the tray is revolved to its initial position the inclined face $b^5$ engages the end of the locking-rod $e^5$ and retracts it until the spring $e^7$ forces it within the mortise $b^6$, thus automatically locking the tray in its upright position.

While we do not wish to be limited to the precise form and construction herein set forth, having thus described our invention, we claim as new, and desire to secure by Letters Patent, the following:

1. In a wagon, a body consisting of a semicylindric sheet-metal tank, channel-bars secured to the side edges of the tank, T-shaped bars secured to the ends of the tank, said bars having their ends bent to embrace the channel-bars and the bottom of the tank, and brace-bars secured to the outer face of the tank and extending from end to end of the latter, for the purpose set forth.

2. In apparatus for the purpose specified, the combination with the running-gear, a frame for supporting the mechanism, an auxiliary frame consisting of T-shaped end pieces carrying trunnions and tie-beams connecting the end pieces, of a tank, diagonal braces beneath the tank, means for tilting the tank and means for holding the tank in its upright position.

3. In apparatus for the purpose specified, the combination with the running-gear, a frame for supporting the mechanism and a tank, of an auxiliary frame for the tank provided with trunnions, diagonal braces beneath the tank, means for tilting the tank, means for automatically locking the tank against turning when it is in its upright position, and means for releasing the locking mechanism.

4. In a dumping-wagon, the combination with the running-gear, a frame for the mechanism and a tank, of an auxiliary framework for the tank formed with T-shaped end pieces and connecting tie-pieces, diagonal members beneath the body of the tank, means for rotating the tank, means for automatically locking the tank in its upright position and means for releasing the locking device.

In testimony whereof we affix our signatures in presence of two witnesses.

RICHARD G. CATOR.
    LEON CATOR.

Witnesses:
 EDWARD C. NORTH,
 WILLIAM L. KNAPP.